Nov. 19, 1963   W. H. TANKE   3,111,351
IMPLEMENT BEARING MOUNTING
Filed May 31, 1962
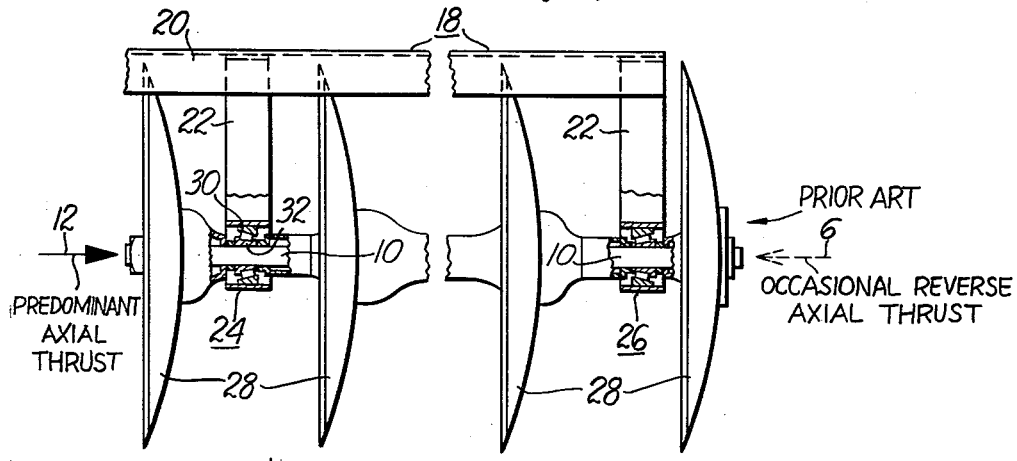
Fig. 1
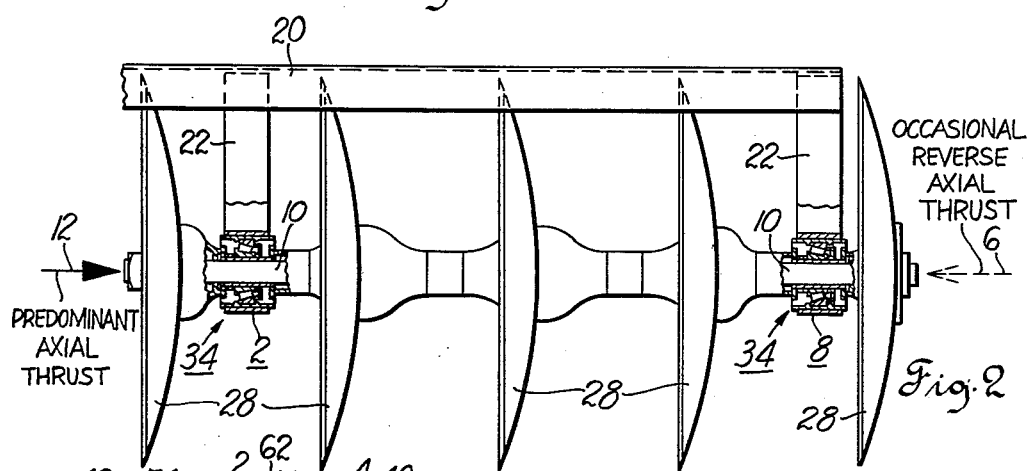
Fig. 2
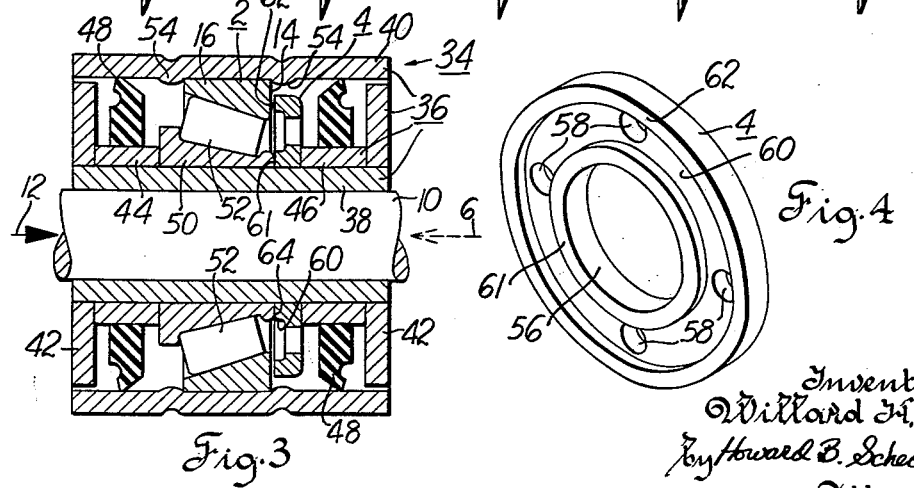
Fig. 3
Fig. 4
Inventor
Willard H. Tanke
By Howard B. Scheckman
Attorney

United States Patent Office 3,111,351
Patented Nov. 19, 1963

3,111,351
IMPLEMENT BEARING MOUNTING
Willard H. Tanke, La Crosse, Wis., assignor to Allis-Chalmers Manufacturing Company, Milwaukee, Wis.
Filed May 31, 1962, Ser. No. 199,013
6 Claims. (Cl. 308—181)

This invention relates to agricultural implements and more particularly to an arrangement for rotatably supporting a shaft.

Implements, such as disk harrows, carry rotating concave earth working disks supported by a shaft. The earth's action on the concave surface of the disks subjects the shaft to axial thrust. Due to the shape of the disks, this axial thrust is predominantly from the same direction for long periods of time.

For short periods of time, however, the axial thrust on the shaft may temporarily be reversed and in the opposite direction. This reversal of thrust can be caused, for example, when making turns or from shock loads.

In the prior art, it is conventional to use tapered roller bearings to support the shaft against axial thrust. A tapered roller bearing is provided at each end of the shaft.

These bearings are positioned facing in opposite directions. One bearing will carry axial thrust from one direction. And, the other bearing will carry axial thrust from the opposite direction.

There is a disadvantage in the above construction.

The predominant axial thrust is only carried by one of the bearings. This bearing is subjected to heavy wear. Either a more expensive or larger bearing must be used, or the bearing will wear out more rapidly.

The other bearing, on the other hand, is subjected to only light occasional axial thrusts. It, in turn, can carry a greater share of the axial thrust than it is carrying.

Of course, one solution would be to provide more bearings to share the predominant axial thrust. But, this would increase the ultimate cost of the implement and place it at a competitive disadvantage.

It is an object of this invention to provide an earth working implement construction having tapered roller bearings that last longer than prior art constructions.

It is another object of this invention to provide a construction that permits the tapered roller bearings to carry larger axial thrusts.

Other objects and advantages will appear from the following description considered in conjunction with the accompanying drawings, in which:

FIG. 1 is a view of a prior art harrow. The shaft that carries the harrow disks is supported by tapered roller bearings that face in opposite directions;

FIG. 2 is a view like FIG. 1 showing the invention. The tapered roller bearings face in the same rather than opposite directions;

FIG. 3 is an enlarged view of FIG. 2 showing the tapered roller bearing and the abutment means that carries temporary reverse axial thrusts; and FIG. 4 is an enlarged perspective view of the abutment means.

INVENTION IN GENERAL

In essence (FIG. 3) the invention is to provide tapered roller bearing 2 with abutment means 4 to carry axial thrust from the direction of arrow 6.

Tapered roller bearings 2, 8 (FIG. 2) support shaft 10. They are positioned so they face in the same direction (to the left).

Bearings 2 and 8 share the predominant axial thrust (arrow 12), while abutment means 4 carries axial thrusts from the opposite direction (arrow 6).

Referring to FIG. 3, each abutment means 4 engages side 14 of outer race 16. The abutment means acts as a second or additional bearing to carry the occasional reverse axial thrusts 6. Additionally, since there is more than one abutment means, the reverse axial thrusts 6 will be shared between all of the abutment means 4, 4. As a result, one abutment means does not have to carry the whole reverse axial thrust by itself.

Under the above circumstances, each abutment means 4 will carry its share of the temporary reverse axial thrusts without excessive wear.

INVENTION SPECIFICALLY

In order to better understand the invention, a prior art disk harrow 18 (FIG. 1), using a conventional tapered roller bearing construction, will first be described.

Referring to FIG. 1, the harrow is made up of a main frame 20, depending hangers 22, 22, tapered roller bearings 24, 26 carried by hangers 22, 22, shaft 10 rotatably supported by tapered roller bearings 24, 26, and earth working harrow disks 28 fixed to shaft 10.

Left hand tapered roller bearing 24 faces to the left. It can carry axial thrust from the left (arrow 12), but not from the right (arrow 6). Axial thrust from the right (arrow 6) would cause relative separating movement between inner race 32 and outer race 30 since there is nothing to prevent such separation.

Right hand tapered roller bearing 26 faces to the right. It can't carry axial thrust from the left (arrow 12), because there is nothing to prevent its races from separating either.

Note that only bearing 24 carries the predominant axial thrust (arrow 12).

Referring to FIG. 2, there is disclosed an agricultural implement in the form of a disk harrow that uses the teachings of this invention. Elements that are like those shown in FIG. 1 are identified by like numbers.

The main difference between the prior art harrow shown in FIG. 1 and the harrow shown in FIG. 2 is the support assembly indicated by numeral 34 that rotatably supports shaft 10.

Referring more specifically to FIGS. 3 and 4, each support assembly 34 comprises:
(1) Housing 36;
(2) Antifriction tapered roller bearing 2; and
(3) Abutment means 4.

(1) *Housing*

Housing 36 is made up of concentric inner and outer tubular sleeves 38 and 40, end plates 42, 42, spacers 44, 46, and grease seals 48, 48.

Shaft 10 is carried within inner sleeve 38, and outer sleeve 40 is carried by hanger 22.

Spacers 44, 46 position bearing 2 and abutment means 4 in housing 36. They also carry grease seals 48, 48 to form a grease compartment on both sides of the bearing.

End plates 42, 42 have an outer diameter slightly smaller than the inside diameter of outer sleeve 40 for passage of grease. They are press fitted on opposite ends of inner sleeve 38. Housing 36 permits the entire support assembly to be easily handled.

(2) *Tapered Roller Bearing*

Each bearing 2, 8 is carried within a housing 36 and is mounted between the ends of sleeves 38, 40.

The bearing is made up of inner race 50, outer race 16 and complementary rollers 52 carried between the races.

Outer race 16 is fixed to outer sleeve 40. Axial displacement of outer race 16 relative to outer sleeve 40 is prevented by means in the form of a pair of ribs 54, 54 in sleeve 40.

Inner race 50 is fixed to inner sleeve 38. Shaft 10, inner sleeve 38 and inner race 50 turn together relative to outer sleeve 40 and outer race 16.

(3) Abutment Means

Referring to FIG. 4, abutment means 4 is a platelike disk that is carried within housing 36.

It contains a central passage 56, to receive inner sleeve 38. Four radially spaced openings 58 are provided for passage of grease. And, its inner face has a circumferential recess 60 to provide a grease pocket, and clearance for the bearing.

Abutment means 4 is positioned so its inner face 61 engages end surfaces 64 of inner race 50. Abtument means 4 is fixed axially relative to inner race 50 by spacer 46. Abutment means 4 is also positioned so its outer face 62 will engage end surface 14 of outer race 16 on relative movement of inner race 50 to the left (FIG. 3).

OPERATION

Refer to FIG. 2. When axial thrust is in the direction of arrow 12, bearings 2 and 8 will each share this predominant axial thrust. This is because they both face in the same direction. In the prior art (FIG. 1), one bearing (24) carried the entire predominant axial thrust.

Assume the axial thrust is in the opposite direction indicated by arrow 6. Each abutment means 4, 4 will move with shaft 10 to the left relative to and into engagement with its outer race 16. The abutment means will then act as a temporary bearing and carry this reverse axial thrust.

When abutment means 4 is in contact with outer race 16, there is sliding contact between the race and abutment means, rather than rolling contact. However, this condition occurs infrequently since, most of the time, the axial thrust is in the direction of arrow 12.

While abutment means 4 is shown as axially fixed relative to inner race 50, its position relative to the two races can be reversed. That is, abutment means 4 could be axially fixed relative to outer race 16 and positioned to engage inner race 50 on relative movement between the two races.

It is noted that while two support assemblies 34, 34 are shown, any number can be used with this invention.

In general terms, the herein disclosed combination of parts embodying the invention comprises a support, as represented by the housing sleeve 40; a rotary element, as represented by the inner housing sleeve 38; an antifriction bearing, as represented by either the bearing 2 or 8 and which limits axial displacement of the rotary element relative to the support in one direction; and abutment means for limiting axial displacement of the rotary element relative to the support in the other direction. The antifriction bearing has an inner race, an outer race and antifriction rollers which taper toward one side of the bearing, as the races 16 and 50 and the rollers 52 shown in FIG. 3 which taper toward the right side of the bearing and which limit axial displacement of the sleeve 38 toward the right in FIG. 3 relative to the sleeve 40. The abutment means comprise an axial thrust transmitting disk member such as the disk 4, which is operatively connected with one of the bearing races and has a side surface in axially abuttable relation to the adjacent end surface of the other race member. In the illustrated embodiment of the invention, the disk member 4 is connected in axial thrust transmitting relation with the inner bearing race 50 and has a side surface 62 in axially abuttable relation to the adjacent end surface 14 of the outer race member 16.

It is not intended to limit this invention to the herein disclosed form. The invention includes such other forms or modifications as are embraced by the scope of the appended claims.

What is claimed is:

1. In an agricultural implement having a rotating shaft that is subjected to axial thrust predominantly from a first direction and occasionally from a reverse direction, the combination comprising: a tapered roller bearing positioned to carry said predominant axial thrust, said bearing having an inner race, an outer race, and rollers between said races; and, abutment means fixed relative to one of said races and positioned to engage the other race on relative separating movement between said races; said abutment means engaging said other race to carry axial thrust from said reverse direction.

2. A device as set forth in claim 1 wherein said abutment means is a circular platelike member that engages the side of said bearing's outer race on relative separating movement.

3. An agricultural implement having a rotating shaft that is subjected to axial thrust predominantly from a first direction and occasionally from a reverse direction, the combination comprising: a plurality of housings to support said shaft; an individual tapered roller bearing carried by each housing, each of said bearings being positioned to share said axial thrust, each of said bearings having an inner race, an outer race, and rollers between said races; and, abutment means also carried by one of said housings, said abutment means being axially fixed relative to one of said bearing's races and positioned to engage the other of its races on relative separating movement between said races, said abutment means engaging said race to carry axial thrust from said reverse direction.

4. A device as set forth in claim 3, wherein each of said housings is provided with an abutment means to share the axial thrust from said opposite direction.

5. In combination, a support; a rotary element; an antifriction bearing operatively interposed between said support and rotary element and having inner and outer race members and antifriction rollers tapering toward one side of said bearing so as to limit axial displacement of said rotary element relative to said support in one direction; and abutment means for limiting axial displacement of said rotary element relative to said support in the other direction, said abutment means comprising an axial thrust transmitting disk member operatively connected, at said one side of said bearing, with said inner race member and having a side surface in axially abuttable relation to the adjacent end surface of said outer race member.

6. In combination, a support; a rotary element; an antifriction bearing operatively interposed between said support and rotary element and having inner and outer race members and antifriction rollers tapering toward one side of said bearing so as to limit axial displacement of said rotary element relative to said support in one direction; and abutment means for limiting axial displacement of said rotary element relative to said support in the other direction, said abutment means comprising an axial thrust transmitting disk member operatively connected with one of said race members and having a side surface in axially abuttable relation to the adjacent end surface of the other of said race members.

References Cited in the file of this patent

UNITED STATES PATENTS

| | | |
|---|---|---|
| 1,853,675 | English | Apr. 12, 1932 |
| 2,272,100 | Thomas et al. | Feb. 3, 1942 |
| 2,314,469 | Walker | Mar. 23, 1943 |
| 2,877,064 | Oehler et al. | Mar. 10, 1959 |

FOREIGN PATENTS

| | | |
|---|---|---|
| 796,015 | Great Britain | June 4, 1958 |